United States Patent [19]

Nakano et al.

[11] Patent Number: 4,477,844
[45] Date of Patent: Oct. 16, 1984

[54] APPARATUS FOR RECORDING A DIGITAL AUDIO SIGNAL IN A TRACK WITH A VIDEO SIGNAL

[75] Inventors: Kenji Nakano, Ebina; Yukihiko Machida, Seki; Kentaro Odaka, Kawasaki, all of Japan

[73] Assignee: Sony Corporation, Tokyo, Japan

[21] Appl. No.: 346,144

[22] Filed: Feb. 5, 1982

[30] Foreign Application Priority Data

Feb. 10, 1981 [JP] Japan .................................. 56-18651

[51] Int. Cl.³ ............................................. H04N 5/782
[52] U.S. Cl. ...................................... 360/8; 360/19.1; 360/32; 360/38.1
[58] Field of Search .............. 358/341, 343; 360/19.1, 360/20, 64, 32, 8, 9, , 10.3, 38.1

[56] References Cited

U.S. PATENT DOCUMENTS

| | | | |
|---|---|---|---|
| 4,303,950 | 12/1981 | Taniguchi et al. .................. | 360/19.1 |
| 4,353,098 | 10/1982 | Heinz et al. .......................... | 360/19.1 |
| 4,390,906 | 6/1983 | Furumoto et al. .................. | 360/19.1 |
| 4,392,162 | 7/1983 | Yamamoto .......................... | 360/10.3 |

*Primary Examiner*—Donald E. McElheny, Jr.

*Attorney, Agent, or Firm*—Lewis H. Eslinger; Alvin Sinderbrand

[57] ABSTRACT

Apparatus for recording and reproducing an information signal comprised of a video signal and an audio signal in a plurality of tracks extending obliquely on a magnetic tape includes a sample and hold circuit, an analog-to-digital converter and an encoder for converting the audio signal to a pulse code modulation (PCM) audio signal; a time base compression circuit for compressing the PCM audio signal; and two rotary magnetic heads for recording the compressed PCM audio signal in the plurality of tracks, each of the tracks being divided into a first leading audio track section, a contral video track section and a trailing audio track section, with the two heads recording one field interval of the video signal in the central track section of each track and recording the audio signal corresponding to one field interval of the video signal recorded in an adjacent track, in the first and second audio track sections of each track such that odd samples of the audio signal are recorded in each first leading audio track section and even samples of the audio signal are recorded in each second trailing audio track section.

13 Claims, 30 Drawing Figures

APPARATUS FOR RECORDING A DIGITAL AUDIO SIGNAL IN A TRACK WITH A VIDEO SIGNAL

BACKGROUND OF THE INVENTION

1. Field of the Invention

This invention relates generally to information signal recording and reproducing apparatus and, more particularly, is directed to apparatus for recording and reproducing a color television signal comprised of a video signal and an audio signal on a magnetic tape with a plurality of rotary magnetic heads.

2. Description of the Prior Art

Information signal recording and reproducing apparatus for recording and reproducing a video signal on a magnetic tape by means of a rotary magnetic head assembly are well known in the art. For example, in the helical scan type video tape recorder (VTR), at least one rotary magnetic head is rotated at a predetermined angle with respect to the longitudinal or tape running direction of a magnetic tape as the latter is advanced so as to form successive video tracks extending obliquely on the magnetic tape. With the helical scan type video tape recorder, it is possible to achieve high density recording of the video signal by advancing the magnetic tape at a slow running speed and, at the same time, providing a high relative speed between the magnetic head assembly and magnetic tape. However, with known helical scan type video tape recorders in which an audio signal is recorded and reproduced on an audio track extending in the longitudinal or tape running direction of the magnetic tape by a stationary magnetic head, there results a deterioration of the signal-to-noise (S/N) ratio and an increase in the wow and flutter when the speed of advancement of the magnetic tape is reduced. This, of course, results in a deterioration in the quality of the reproduced audio signal, causing the audio signal to have unsatisfactory quality when reproduced.

In order to overcome the aforementioned problem in the recording and reproducing of an audio signal by a stationary magnetic head, it has been proposed to effect the recording and reproducing of the audio signal by means of a rotary magnetic head. With this proposal, an overscan section is provided for each oblique track, for example, by increasing the tape winding angle about the guide drum assembly of the helical scan type video tape recorder. In this manner, each record track obliquely formed on the magnetic tape by the rotary magnetic head assembly includes a video track section and an audio track section, the latter of which corresponds to the aforementioned overscan section. The audio signal that is recorded and reproduced with respect to the audio track section of each track is processed as high density data obtained by processing the signal with a time axis or base compression and a time axis or base expansion.

However, in the case described above where the audio signal is recorded and reproduced by means of a rotary magnetic head, if an external disturbance, such as a tracking error of the rotary magnetic head or drop-out of information results, there results a consequent loss of a great quantity of the reproduced audio signal which, in turn, results in large generation of noise. For example, drop-out of information may result from damage caused by a tape guide or the like to the tape edge where the audio signal is recorded at the leading or trailing end of each oblique record track. The generation of noise due to the aforementioned external disturbances is very likely where the audio signal is recorded and reproduced as a high density audio signal by means of time base compression and time base expansion processing. In such case, since the audio signal is recorded as compressed data, any tracking deviation with respect to the audio track section or any drop-out caused by damage to the tape edge will result in a large quantity of the audio signal being lost.

OBJECTS AND SUMMARY OF THE INVENTION

Accordingly, it is object of this invention to provide an information signal recording and reproducing apparatus that avoids the above-described difficulties encountered with the prior art.

More particularly, it is an object of this invention to provide an information signal recording and reproducing apparatus where the audio signal is recorded and reproduced with a rotary magnetic head assembly.

It is another object of this invention to provide an information signal recording and reproducing apparatus in which noise that is produced when data is lost due to external disturbances does not substantially impair the reproduced sound.

It is still another object of this invention to provide an information signal recording and reproducing apparatus in which drop-out of audio data recorded in record tracks extending obliquely on a magnetic tape caused by damage to a tape edge does not substantially impair the reproduced sound.

In accordance with an aspect of this invention, apparatus for recording an information signal comprised of a video signal and an audio signal in a plurality of tracks on a record medium includes means for converting the audio signal into digital form; means for compressing the digitized audio signal; and means for recording the compressed digitized audio signal and the video signal in the plurality of tracks, each of the plurality of tracks being divided into at least three sections having a predetermined relation with respect to each other, and the compressed digitized audio signal being recorded in at least two of the sections and the video signal being recorded in at least one of the sections of each track.

The above, and other, objects, features and advantages of the present invention will be apparent from the following detailed description which is to be read in connection with the accompanying drawings.

DETAILED DESCRIPTION OF THE PREFERRED EMBODIMENTS

Figure 1:
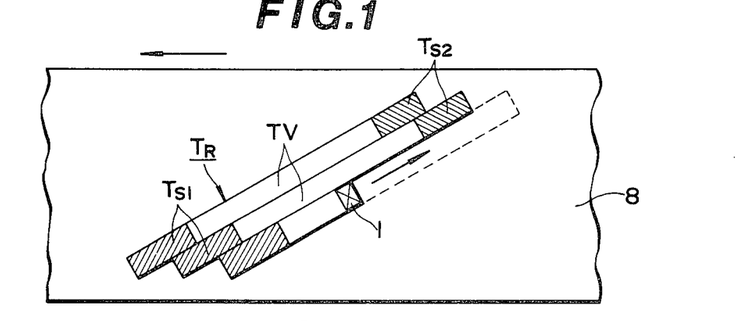
FIG. 1 is a schematic plan view of a section of magnetic tape showing the arrangement of the tracks recorded thereon with the information signal recording and reproducing apparatus according to this invention.

Referring to the drawings in detail, and initially to FIG. 1 thereof, a section of magnetic tape 8 is shown having record tracks $T_R$ extending obliquely on magnetic tape 8 without guard bands between adjacent tracks $T_R$, that is, with the longitudinal edges of adjacent tracks $T_R$ being recorded in an abutting relation. In accordance with the present invention, record tracks $T_R$ are recorded by a rotary magnetic head 1 and are each divided into three track sections, that is, a central video track section $T_V$, a first audio track section $T_{S1}$ formed at the leading end of each track and a second audio track section $T_{S2}$ formed at the trailing end of each track, with one field of video information being recorded in the video track section $T_V$ of each track.

Figure 2A:
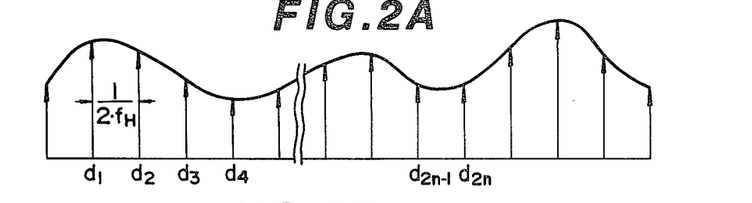
FIGS. 2A–2D are schematic diagrams used for illustrating the recording of an audio signal with the information signal recording and reproducing apparatus according to this invention.
Figure 2B:
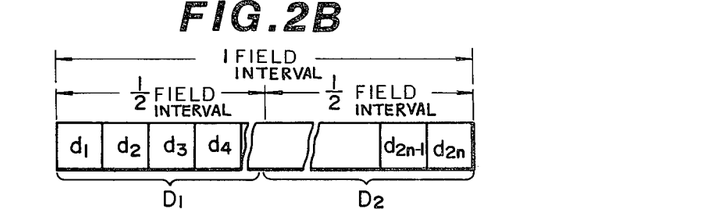
Figures 2C, 2D:
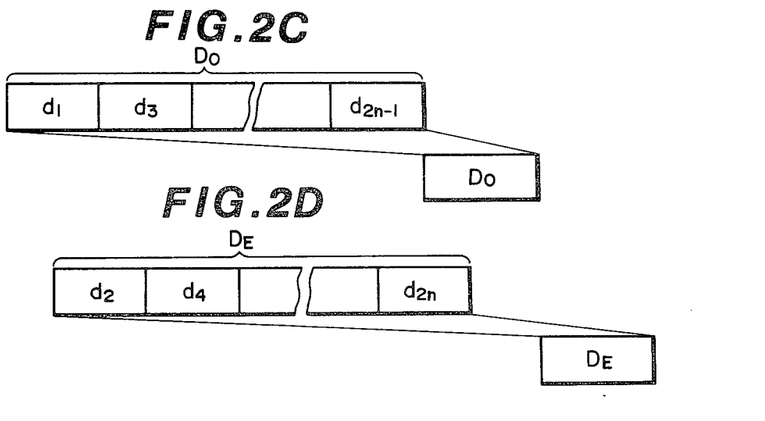

If the audio signal has a waveform shown by the solid line in FIG. 2A, in accordance with the present invention, the audio signal is sampled with a sampling pulse at a frequency $2f_H$, where $f_H$ is the horizontal scanning frequency. The sampled audio data is then encoded and time base compressed to obtain sequential pulse code modulated (PCM) audio data $d_1, d_2 \ldots, d_{2n}$, as shown in FIG. 2B, where n is a positive integer, and which is then alternately distributed to different groups such that odd number PCM data $d_1, d_3, \ldots, d_{2n-1}$, as shown in FIG. 2C, is distributed to an odd number block data group $D_O$ and even number PCM data $d_2, d_4, \ldots, d_{2n}$, as shown in FIG. 2D, is distributed to an even number block data group $D_E$ for each field interval. It is to be appreciated that each block data group $D_O$ and $D_E$ includes PCM data corresponding to one field interval of the video signal. Accordingly, the odd number block data group $D_O$ is recorded in first audio track section $T_{S1}$ of each track and the even number block data group $D_E$ is recorded in the second audio track section $T_{S2}$ of each track.

Figure 3:
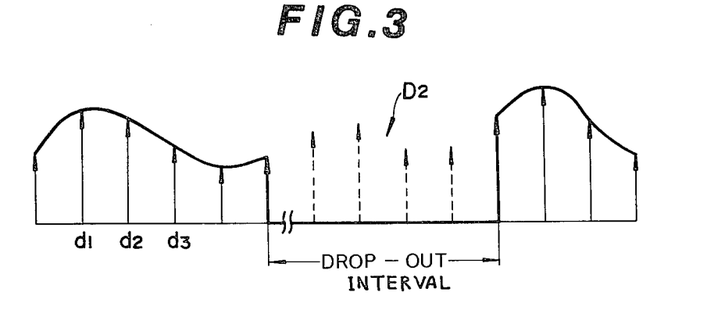
FIG. 3 is a waveform diagram used for illustrating drop-out of audio information with an information signal recording and reproducing apparatus according to the prior art.

It is to be appreciated that the above system of recording the audio signal in each record track provides distinct advantages over the prior art. In particular, with the prior art, it has been proposed to record the sequential PCM audio signal in an overscan section either at the leading end of each track or the trailing end of each track. In such case, as shown in FIG. 3, loss of audio information caused, for example, by damage to the edge of the tape by a tape guide roller or the like or caused by tracking errors of the reproducing magnetic head, in the one-half field interval data group $D_2$, for example, results in the generation of noise and a consequent deterioration of the reproduced sound. Even if the PCM audio data $d_1, d_2, \ldots, d_{2n}$ is divided into one-half field block data groups $D_1$ and $D_2$, as shown in FIG. 2B, which are recorded in respective audio track sections $T_{S1}$ and $T_{S2}$, drop-out in one of the audio track sections, for example, track section $T_{S1}$, results in loss of the audio signal corresponding to one-half of a video field interval.

Figure 4:
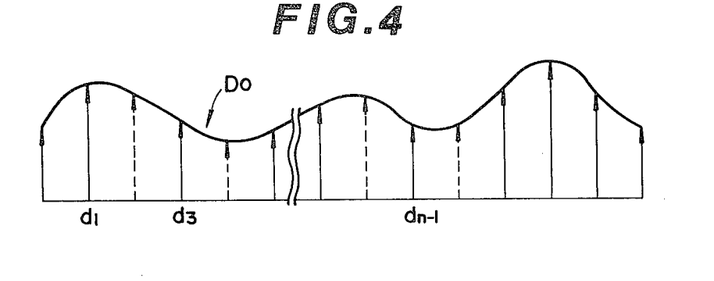
FIG. 4 is a waveform diagram used for illustrating drop-out of audio information with the information signal recording and reproducing apparatus according to this invention.

The present invention, on the other hand, records the block data group $D_O$ comprised of odd number PCM audio data $d_2, d_4, \ldots d_{2n-1}$ in each first audio track section $T_{S1}$ and the block data group $D_E$ comprised of even number PCM audio data $d_2, d_4, \ldots d_{2n}$ in each second audio track section $T_{S2}$. In such case, even if drop-out occurs in audio track section $T_{S2}$, so as to result in the loss of even number PCM data from block data group $D_E$, substantially correct reproduction of the audio signal can be obtained with substantially no impairment of the reproduced sound, by reproducing only the odd number PCM data in block data group $D_E$, from the first audio track signal $T_{S1}$, as shown in FIG. 4. In such case, only the sampling frequency reduced is reduced from $2f_H$ to $f_H$. However, deterioration of the signal-to-noise (S/N) ratio is minimized so as to result in substantially no impairment of the reproduced sound.

Figure 5:
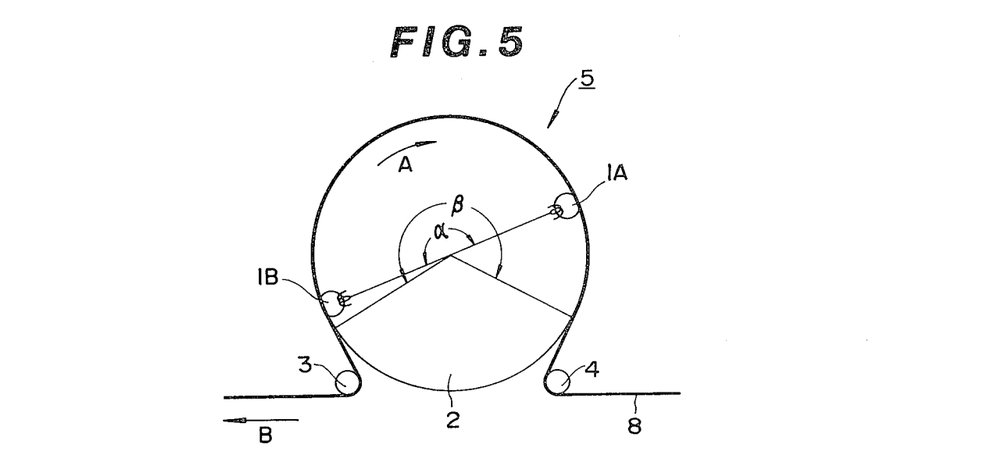
FIG. 5 is a schematic plan view of a rotary magnetic head assembly according to one embodiment of this invention that can be used with a helical scan type video tape recorder having two magnetic recording heads.
Figure 6:
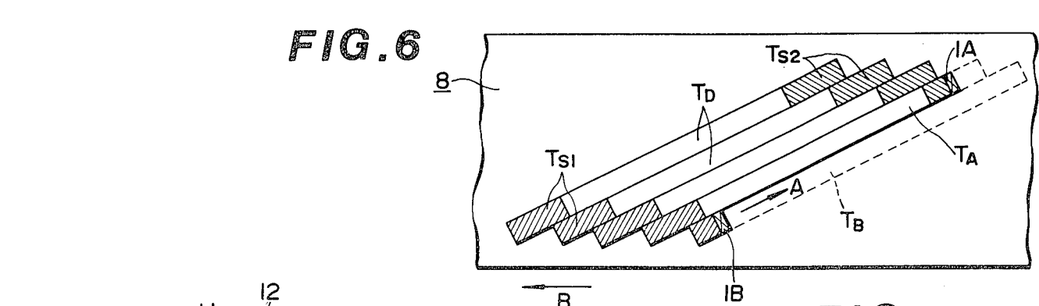
FIG. 6 is a schematic plan view of a section of of magnetic tape showing the arrangement of tracks in which the signals are recorded with the rotary magnetic head assembly of FIG. 5.

Referring now to FIG. 5, a rotary magnetic head assembly 5 for recording the audio signal and video signal in the format shown in FIG. 1 according to this invention includes two rotary magnetic heads 1A and 1B which are arranged to subtend an angle $\alpha$ of 180°, that is, the two rotary magnetic heads 1A and 1B or arranged in opposing relation to each other. Rotary magnetic head assembly 5 includes a rotary guide drum 2 which is rotated at a constant speed in the direction of arrow A, and a magnetic tape 8 is helically wound about the outer periphery of rotary guide drum 2 so as to subtend an angle $\beta$ of approximately 220°. Magnetic tape 8 is advanced at a constant speed in the directon of arrow B by a tape drive system (not shown) comprised of a capstan and pinch roller and is guided by guide rollers or pins 3 and 4. During the recording operation, rotary magnetic heads 1A and 1B alternately trace record tracks $T_A$ and $T_B$, as shown in FIG. 6. In this manner, each record track $T_A$ is used for recording video and audio siqnals in odd field intervals, while the remaining record tracks $T_B$ are used for recording video and audio signals in even field intervals.

It is to be appreciated that, since the angle $\alpha$ between rotary magnetic heads 1A and 1B is less than the angle $\beta$ subtended by the tape wound about the outer periphery of rotary guide drum 2, rotary magnetic heads 1A and 1B are simultaneously in contact with magnetic tape 8 for a period corresponding to an angle $\beta - \alpha$, which is equal to 40° in the above-described embodiment. Accordingly, each track includes an overlap section in which rotary magnetic heads 1A and 1B are simultaneously in contact with magnetic tape 8, as indicated by the shaded lines at the leading and trailing ends of each track in FIG. 6. The overlap section at the leading end of each track is the first audio track section $T_{S1}$ in which the odd number block data group $D_O$ is recorded and the overlap section at the trailing end of each track is the second audio track section $T_{S2}$ in which the even number block data group $D_E$ is recorded. Further, the audio signal is recorded in audio track sections $T_{S1}$ and $T_{S2}$ so as to have a predetermined phase relation with the horizontal synchronizing signal of the video signal in another field interval recorded by the respective rotary magnetic heads 1A and 1B. For example, the audio signal recorded in audio track section $T_{S1}$ of track $T_A$ has a predetermined phase relation with the horizontal synchronizing signal of the video signal recorded in a track $T_B$. In this manner, the audio signal for each field can easily and reliably be reproduced during playback by using the horizontal synchronizing signal of the reproduced video signal.

Figure 7:
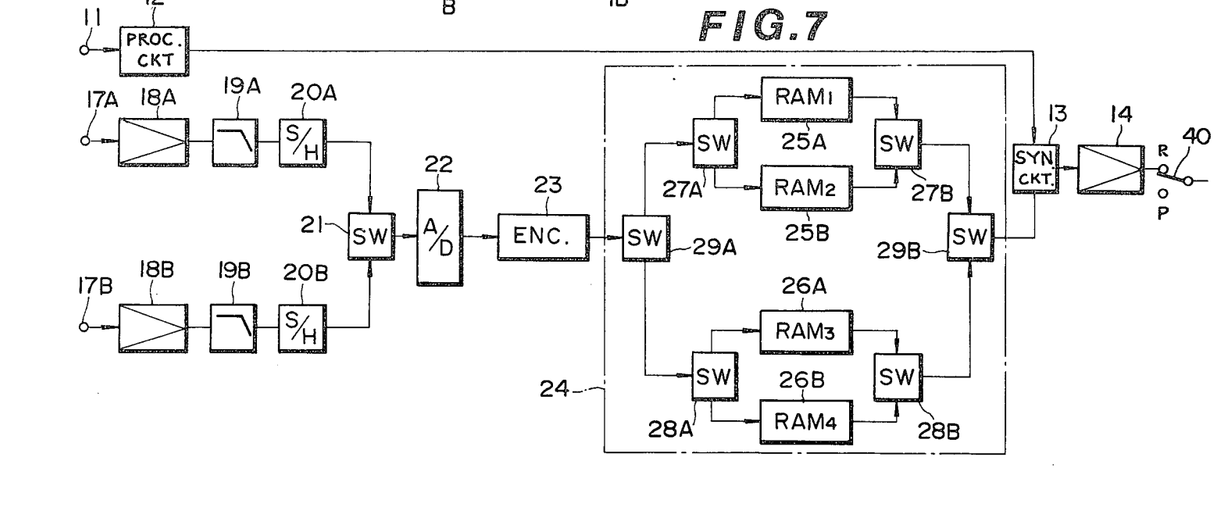
FIG. 7 is a block diagram of a recording section of an information signal recording and reproducing apparatus according to one embodiment of this invention.
Figure 8A:
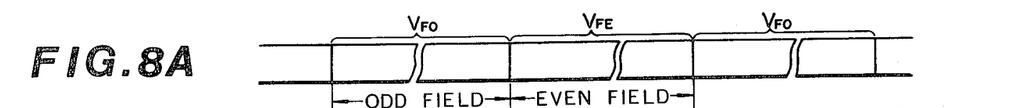
FIGS. 8A–8J are time charts used for illustrating the operation of the recording section of FIG. 7.
Figures 8B, 8C, 8D:
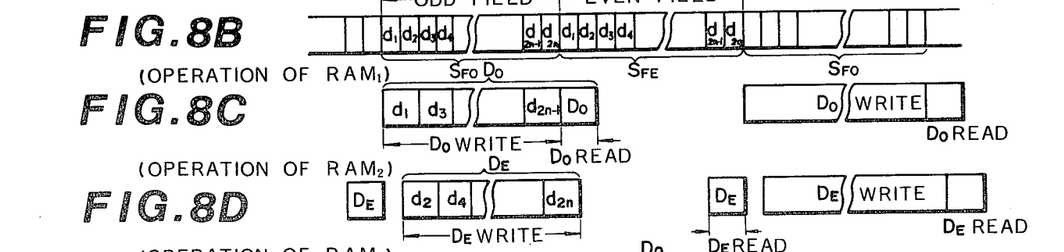

Referring now to FIG. 7, a block diagram of a recording section of an information signal recording and reproducing apparatus according to one embodiment of this invention includes a video signal processing circuit 12 supplied with the video signal through a video input terminal 11 and which, in turn, supplies the processed video signal to a signal synthesizing circuit 13. The recording section further includes two channels for processing a two-channel audio signal. In particular, one channel is supplied with the audio signal from an audio input terminal 17A and supplies the same through an input amplifier 18A, a low-pass filter 19A which limits the band width of the signal and finally through a sample and hold circuit 20A to a signal synthesizing circuit 21. Sample and hold circuit 20A samples the audio signal with a sampling pulse having a frequency of $2f_H$. In like manner, the other channel is supplied with the audio signal from an audio input terminal 17B, and supplies the same through an input amplifer 18B, a low-pass filter 19B and a sample hold circuit 20B to signal synthesizing circuit 21. The latter circuit multiplexes the audio signal and supplies the multiplexed audio signal to an analog-to-digital (A/D) converter circuit 22 for digitally converted each sampled output to a multi-bit code, and the digitized audio signal is thereafter supplied to an encoder 23 which converts the digitized audio signal into, for example, a pulse code modulation (PCM) signal, as shown in FIG. 8B, which is supplied to a time base compression circuit 24.

Figures 8E, 8F, 8G, 8H, 8I, 8J:
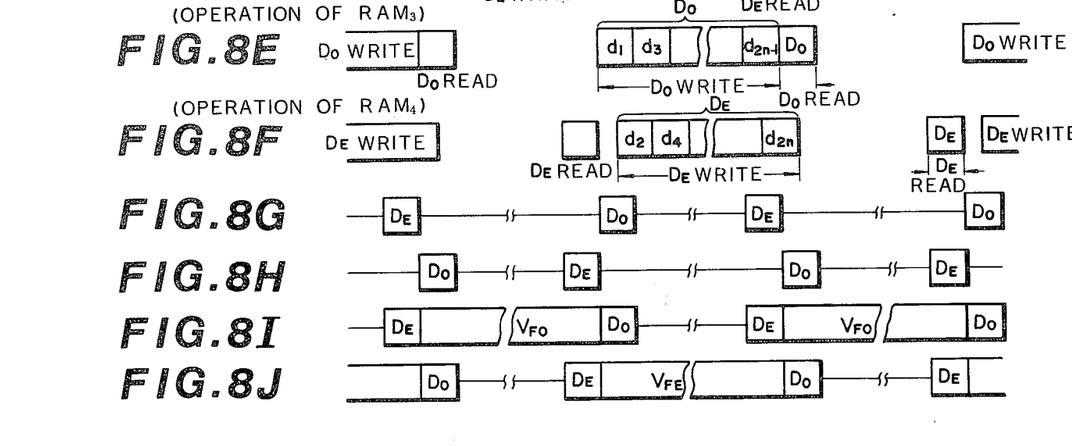

Time base compression circuit 24 includes first through fourth random access memories (RAM) 25A, 25B, 26A, and 26B, each having a capacity to store the PCM digitized audio signal for one field interval. Selection switches 27A and 27B, 28A and 28B, and 29A and 29B are provided for controlling the writing in and reading out of information from RAMs 25A, 25B, 26A and 26B. In particular, selection switch 29A supplies the digitized audio signal corresponding to one odd field from encoder 23 to selection switch 27A which, in turn, alternately supplies samples of digitized data to RAMS 25A and 25B such that the PCM audio data from odd number block data group $D_O$ of that odd field interval is written into RAM 25A and PCM audio data from the even number block data group $D_E$ of the odd field interval is written into RAM 25B. During the next even field interval the contents of RAM 25A, that is, the PCM audio data from odd number block data group $D_O$, is read out at a high speed from RAM 25A during the beginning of the even field interval and the PCM audio data from even number block data group $D_E$ is read out at high speed from RAM 25B during the end of the even field interval, as shown in FIGS. 8C and 8D, respectively. In like manner, during the even field interval, selection switch 29A supplies the digitized audio signal to selection switch 28A which, in turn, writes the PCM audio data from the odd number block data group $D_O$ of that field into RAM 26A and writes the PCM audio data from the even number block data group $D_E$ for that field into RAM 26B. During the next odd field interval when the digitized audio data is being written into RAMS 25A and 25B, selection switch 28B reads the PCM audio data of the odd number block data group $D_O$ from RAM 26A at a high speed during the beginning of that odd field interval and reads the PCM audio data of the even number block data group $D_E$ from 26B at a high speed during the end of that odd field interval, as shown in FIGS. 8E and 8F, respectively. In this manner, the audio signals from switches 27B and 28B are time base compressed with respect to the audio signals supplied to switches 27A and 28A.

The read out audio signal from selection switch 27B is shown in FIG. 8G and the read out audio signal from selection switch 28B as shown in FIG. 8H. It is to be appreciated that selection switch 27B is controlled so that the contents of RAMS 25A and 25B are alternately read out at the leading and trailing ends of each even field interval. In like manner, selection switch 28B is controlled so that the contents of RAM 26A and 26B are alternately read out at the leading and trailing ends, respectively, of each odd field interval. The outputs of selection switches 27B and 28B are supplied to a selection switch 29B which, in turn, combines the signals and supplies the combined, compressed audio signal to signal synthesizing circuit 13. Selection switches 27A, 27B, 28A, 28B, 29A and 29B are controlled by the PCM audio signal supplied from encoder 23 to effect the writing and reading operations.

Thereafter, in signal synthesizing circuit 13, the processed video and digitized audio signals from each field are synthesized to obtain the recording signal for each odd field interval, as shown in FIG. 8I, and for each even field interval, as shown in FIG. 8J, and which are thereafter amplified by recording amplifier 14 and coupled through a recording (R) and reproducing (P) mode selection switch 40 to rotary magnetic head assembly 5. Accordingly, the recording signal for each odd field is recorded in tracks $T_A$ on magnetic tape 8 with the first rotary magnetic head 1A and the recording signal for each even field is recorded in the remaining record tracks $T_B$ with the second rotary magnetic head 1B. As apparent from FIGS. 8A-8J, the time base compressed digitized audio signal of each even field interval is recorded in an overlapping time-wise relation with the video signal of the next adjacent odd field interval, and with the digitized audio signal having a predetermined phase relation with the horizontal synchronizing signal of the video signal in such next adjacent odd field interval. In like manner, the time base compressed digitized audio signal of each odd field interval is recorded in an overlapping time-wise relation with the video signal of the next adjacent even field interval, and with the digitized audio signal of each odd field interval having a predetermined phase relation with the horizontal synchronizing signal of the video signal in such next adjacent even field interval. With the above embodiment, time base compression circuit 24 compresses the digitized audio signal for one field to a period of approximately 40H, that is, 40 horizontal line intervals and records the time base compressed digitized audio signal as a data block for each horizontal field period (1H). In other words, the digitized audio signal is recorded having a predetermined positional relation with respect to the position of each horizontal synchronizing signal in the tracks.

Figure 9:
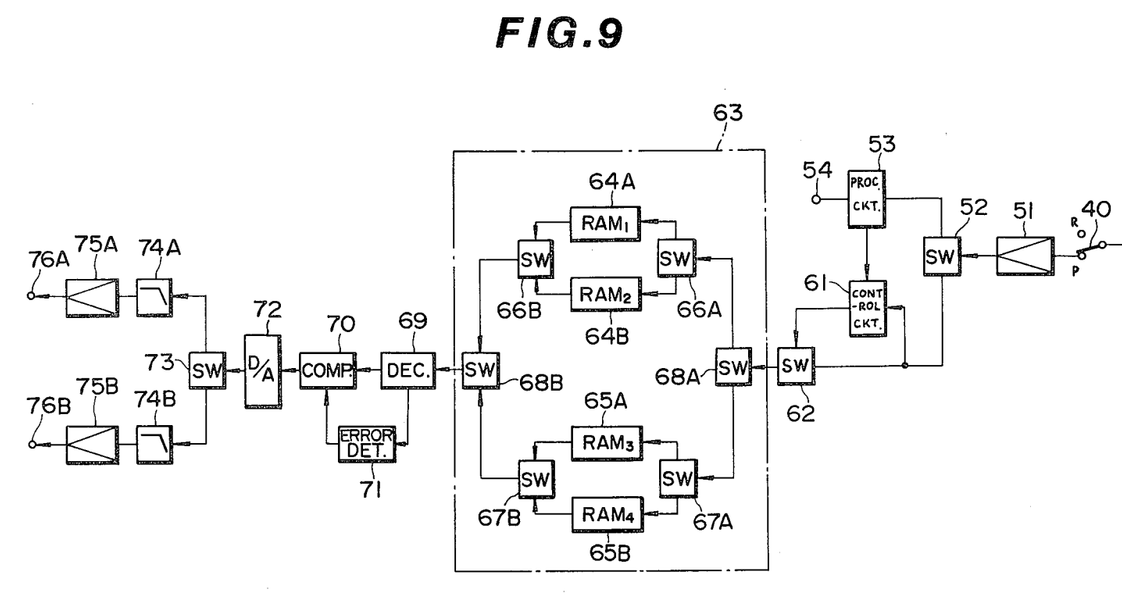
FIG. 9 is a block diagram of a reproducing section of an information signal recording and reproducing apparatus according to one embodiment of this invention.
Figure 10A:
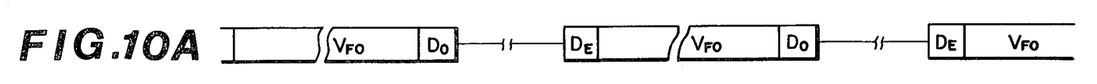
FIGS. 10A–10I are time charts used for illustrating the operation of the reproducing section of FIG. 9.
Figure 10B:
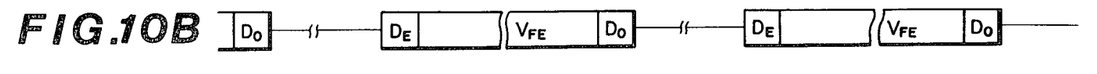
Figure 10C:
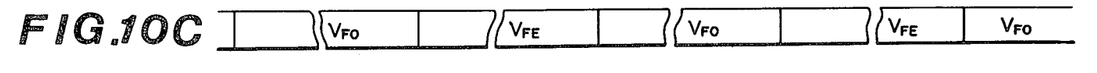
Figure 10D:
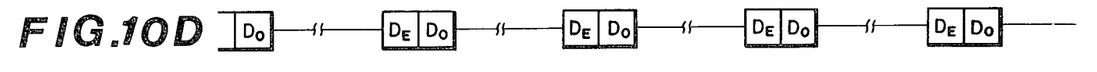

Referring now to FIG. 9, a reproducing section which is complimentary to the recording section of FIG. 7 includes a reproducing amplifier 51 supplied with the signals (FIGS. 10A and 10B) reproduced by rotary magnetic heads 1A and 1B, through mode selection switch 40 which, as shown in FIG. 9, is switched to its playback position. The amplified output from reproducing amplifier 51 is supplied to a signal separating circuit 52 which separates the reproduced video signal and reproduced digitized audio signal. The reproduced video signal, as shown in FIG. 10C, is then supplied to a processing circuit 53 which, in turn, supplies a processed reproduced video signal to a video output terminal 54. Processing circuit 53 also extracts the reproduced horizontal synchronizing signal from the reproduced video signal and supplies the reproduced horizontal sychronizing signal to a control circuit 61 which is also supplied with the reproduced digitized audio signal from signal separating circuit 52. Control circuit 61 detects marker data in the reproduced audio signal by means of the reproduced horizontal synchronizing signal, the latter of which is used as a reference signal for detecting the timing of the audio signal and control circuit 61, in turn, supplies an audio data selection signal to a signal selecting circuit 62 each time the marker data is detected. Signal selection circuit 62 is also supplied with the reproduced digitized audio signal from signal separating circuit 52 and operates to supply the reproduced time base compressed audio signals from data groups $D_E$ and $D_O$, as shown in FIG. 10D, to a time base expansion circuit 63, based upon the audio data selection signal from control circuit 61.

Figure 10E:
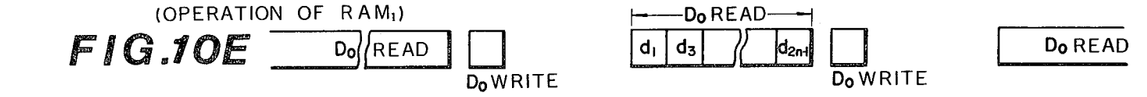
Figure 10F:
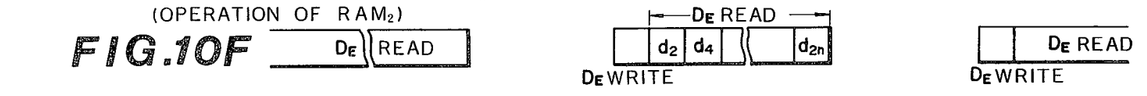

Time base expansion circuit 63 includes first through fourth random axis memories (RAM) 64A, 64B, 65A, and 65B, each capable of storing the digitized audio signal corresponding to one field interval. Further, selection switches 66A and 66B, 67A and 67B, and 68A and 68B are also provided for controlling the writing into and reading out of audio information from the RAMs. In particular, selection switch 68A is supplied with the output audio signal from signal selecting circuit 62 and distributes the digitized audio signal corresponding to odd field intervals to switch 66A and the digitized audio signal corresponding to even field intervals to switch 67A. Selection switch 66A thereafter supplies the PCM audio data from the odd number block data group $D_O$ of each odd field interval to RAM 64A and the PCM audio data from the even number block data group $D_E$ of each odd field interval to RAM 64B. Since the PCM audio data from the odd and even number block data groups $D_O$ and $D_E$ in each odd field interval occur at different times in such field interval, that is, at the beginning and end portions of each odd field interval, switch 66A alternately controls the writing in of the respective information into RAMS 64A and 64B. In particular, in each odd field interval, the odd and even number block data groups $D_O$ and $D_E$ are written in the respective first and second RAMs 64A and 64B during the initial and final portions of the respective odd field interval under the control of a high speed clock synchronized to the bit frequency of the PCM audio signal. During the next even field interval, the PCM audio data in the odd and even number block data groups $D_O$ and $D_E$ are read out from RAMs 64A and 64B under the control of a normal or slower clock, as shown in FIGS. 10E and 10F. In this manner, the audio data is time base expanded and alternately supplied to switch 68B by means of selection switch 66B, thereby redistributing or synthesizing PCM audio data in the odd and even number block data groups $D_O$ and $D_E$. In other words, in such case, the PCM data signals $d_1, d_2, \ldots d_n$ are successively read out in order from selection switch 66B during each even field interval.

Figure 10G:
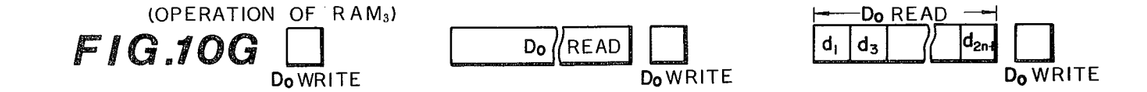
Figure 10H:
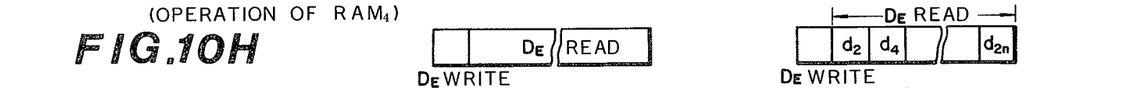
Figure 10I:
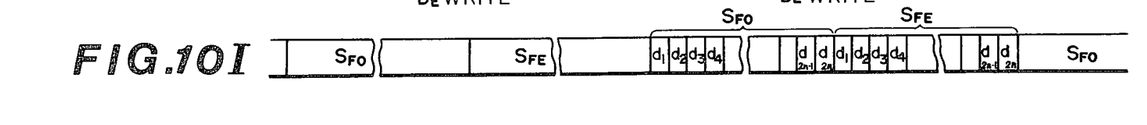

In like manner, during each even field interval, the digitized audio signal is written into RAMs 65A and 65B by selection switch 67A under the control of a high speed clock synchronized to the bit frequency of the PCM audio signal. In particular, the odd number block data group $D_O$ for each even field interval is written into RAM 65A and the even number block data group $D_E$ for each even field interval is written into RAM 65B. During each odd field interval, the PCM audio data stored in RAMs 65A and 65B is alternately read out by switch 67B under the control of a normal or slower clock so as to time base expand the signal stored in RAMs 65A and 65B, as shown in FIGS. 10G and 10H, respectively. Selection switch 67B synthesizes or combines the outputs from RAMs 65A and 65B to provide a continuous or successive stream of PCM audio data $d_1, d_2, \ldots, d_{2n}$ which is supplied to selection switch 68B. The latter switch combines the outputs from selection switches 66B and 67B, which occur respectively during odd and even field intervals, to provide a continuous audio signal, as shown in FIG. 10I.

The PCM audio signal from time base expansion circuit 63 is thereafter coupled through a decoder 69 for decoding the PCM audio signal. The output of decoder 69 is then supplied through an error detecting circuit 71 to an average value interpolating circuit 70 and also directly to average value interpolating circuit 70. Error detecting circuit 71 detects whether one of the block data groups $D_O$ and $D_E$ is lost, and if so, causes average value interpolating circuit 70 to effect an average value interpolation with the audio data in the remaining block data group. In such case, a digitized audio signal which has been compensated for the lost data is supplied to a digital-to-analog (D/A) converter circuit 72. In the case where there is no lost data, the output of decoder 69 is merely coupled through average value interpolating circuit 72 to digital-to-analog converter circuit 72. The latter circuit converts the digitized audio signal into an analog audio signal and supplies such analog audio signal to a signal distributing circuit 73 which distributes the analog audio signal to the individual channels of the audio output system. Thus, for example, each channel includes a low-pass filter 74A, 74B and an output amplifier 75A, 75B, with the output audio signals for the channels being provided at respective output terminals 76A and 76B.

It is to be appreciated that various modifications within the scope of this invention can be made by one of ordinary skill in the art. For example, in the above embodiment of the present invention, the record tracks $T_R$ extending obliquely on magnetic tape 8 have been divided into three track sections, with the central section being used as a video track section $T_V$, the leading end section being used as the first audio track section $T_{S1}$ and the trailing end section being used as the second audio track section $T_{S2}$. However, this arrangement of the video track section $T_V$ and the first and second audio track sections $T_{S1}$ and $T_{S2}$ are by no means limiting to the present invention. For example, it may be possible to provide the first and second audio track section $T_{S1}$ and $T_{S2}$ at the leading (or trailing) end sections of each record track $T_R$. Further, the audio signals recorded in audio track sections $T_{S1}$ and $T_{S2}$ may not correspond to the video signal recorded in the video track section $T_V$ and may correspond to the video signal in an adjacent video track section. Rather, it is important that at least three sections be provided, with at least two of such sections in each track being used for recording the audio signal and the audio signal being alternately distributed to the different sections so that if the audio signal recorded in one of the track sections is lost, the audio signal recorded in the other track section or sections can be reproduced with substantially no impairment of the reproduced sound.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Apparatus for recording an information signal comprised of a video signal and an audio signal in a plurality of tracks on a record medium, comprising:
   means for converting said audio signal into digital form, said means for converting including means for sampling said audio signal at a predetermined frequency to produce successive digitized samples of said audio signal;
   means for compressing said digitized audio signal; and
   means for recording said compressed digitized audio signal and said video signal in said plurality of tracks, each of said plurality of tracks being divided into a leading track section, a central track section and a trailing track section, wherein said means for recording records alternate said samples of said digitized audio signal in said leading track section and the remaining said samples of said digitized audio signal in said trailing track section and said video signal in said central section of each track.

2. Apparatus according to claim 1; in which said means for recording records one field interval of said video signal in each central track section and records said audio signal corresponding to one field interval of said video signal in said leading and trailing track sections of each track.

3. Apparatus according to claim 1; in which said means for recording records substantially all of said samples of said audio signal corresponding to one field interval of said video signal in said leading and trailing track sections of each track.

4. Apparatus according to claim 1; in which said means for compressing includes a plurality of memory means for storing said audio signal at a first rate and for reading out said audio signal at a second, faster rate.

5. Apparatus according to claim 1; in which said means for converting includes means for converting the sampled audio signal into a pulse code modulation audio signal.

6. Apparatus according to claim 1; in which the compressed digitized audio signal recorded in each track corresponds to the video signal recorded in another track.

7. Apparatus according to claim 6; in which the compressed digitized audio signal recorded in each track corresponds to the video signal recorded in an adjacent track.

8. Apparatus according to claim 1; in which said means for recording includes rotary magnetic head means for recording said compressed digitized audio signal and said video signal in said plurality of tracks.

9. Apparatus according to claim 8; in which said rotary magnetic head means includes first and second rotary heads for alternately recording said video signal in said plurality of tracks, and for simultaneously recording said compressed digitized audio signal in adjacent ones of said tracks.

10. Apparatus according to claim 9, in which said first rotary magnetic head records said compressed digitized audio signal in the leading track section of a track when said second rotary magnetic head records said compressed digitized audio signal in the trailing track section of an adjacent track; and said first rotary magnetic head records said compressed digitized audio signal in the trailing track section of a track when said second rotary magnetic head records said compressed digitized audio signal in the leading track section of an adjacent track.

11. Apparatus for recording an information signal comprised of a video signal and an audio signal in a plurality of tracks on a record medium, comprising:
   means for converting said audio signal into digital form;
   means for compressing said digitized audio signal having a plurality of memory means for storing said audio signal at a first rate and for reading out said audio signal at a second, faster rate including a first set of memory means for compressing said digitized audio signal corresponding to odd field intervals of said video signal and a second set of memory means for compressing said digitized audio signal corresponding to even field intervals of said video signal; and
   means for recording said compressed digitized audio signal and said video signal in said plurality of tracks, each of said plurality of tracks being divided into at least three sections having a predetermined relation with respect to each other, and said means for recording records said compressed digitized audio signal in at least two of said sections of each track and said video signal in at least one of said sections of each track.

12. Apparatus according to claim 11; in which said means for converting includes means for sampling said audio signal at a predetermined frequency to produce successive samples of said audio signal; said first set of memory means includes first memory means for compressing alternate samples of said audio signal corresponding to each odd field interval and for reading out said compressed alternate samples during the beginning of the next field interval, and second memory means for compressing the remaining samples of said audio signal corresponding to each odd field interval and for reading out said compressed remaining samples during the end of the next field interval; and said means for recording records said compressed alternate samples corresponding to each odd field interval during the beginning of the next field interval and records said compressed remaining samples corresponding to each odd field interval during the end of the next field interval.

13. Apparatus according to claim 12; in which said second set of memory means includes third memory means for compressing alternate samples of said audio signal corresponding to each even field interval and for reading out said compressed alternate samples during the beginning of the next field interval, and fourth memory means for compressing the remaining samples of said audio signal corresponding to each even field interval and for reading out said compressed remaining samples during the end of the next field interval; and said means for recording records said compressed alternate samples corresponding to each even field interval during the beginning of the next field interval and records said compressed remaining samples corresponding to each even field interval during the end of the next field interval.

* * * * *